(No Model.)
T. J. LYNCH.
LACED SHOE.
No. 332,159. Patented Dec. 8, 1885.
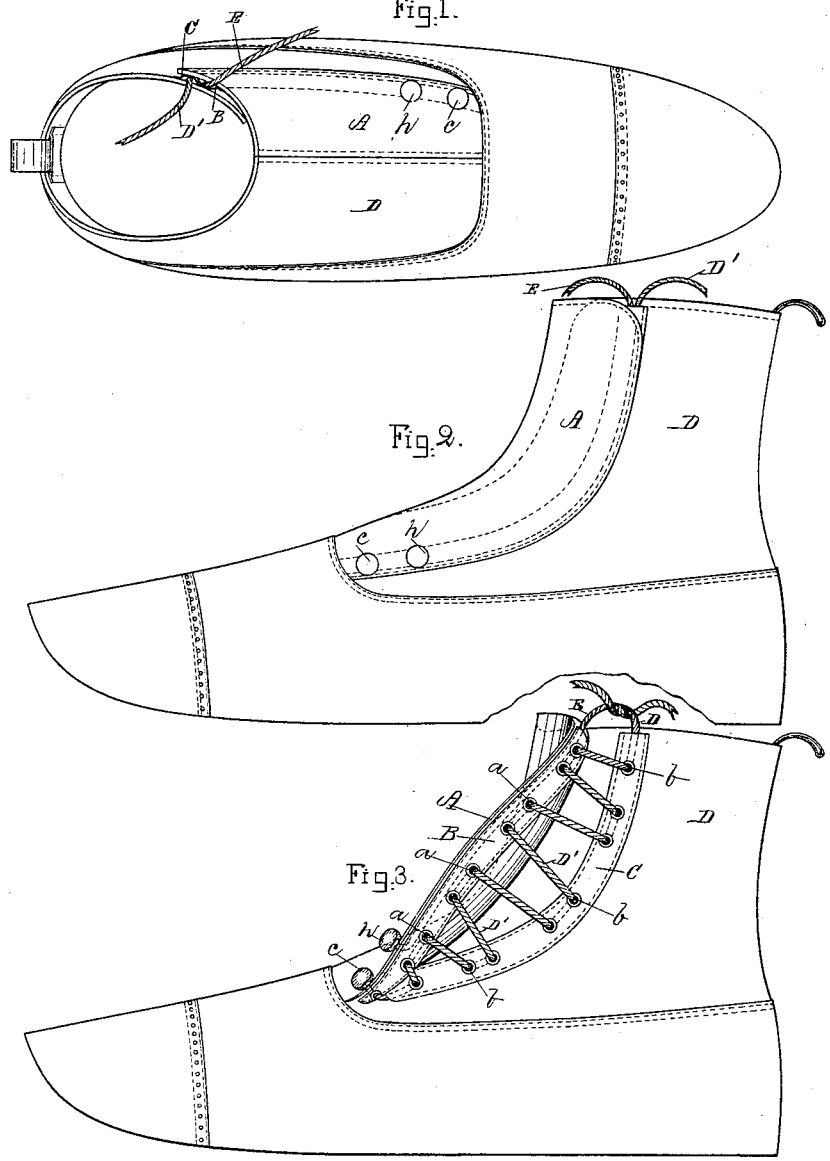
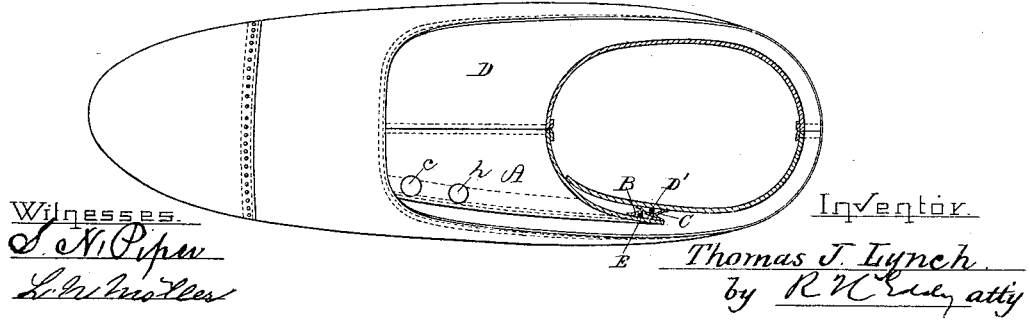
Witnesses.
S. N. Piper
L. W. Mottes
Inventor.
Thomas J. Lynch
by R. N. Reedy atty

UNITED STATES PATENT OFFICE.

THOMAS JOSEPH LYNCH, OF MILFORD, MASSACHUSETTS.

LACED SHOE.

SPECIFICATION forming part of Letters Patent No. 332,159, dated December 8, 1885.

Application filed August 17, 1885. Serial No. 174,608. (No model.)

*To all whom it may concern:*

Be it known that I, THOMAS JOSEPH LYNCH, of Milford, in the county of Worcester, of the Commonwealth of Massachusetts, have invented a new and useful Improvement in Laced Shoes; and I do hereby declare the same to be described in the following specification and represented in the accompanying drawings, of which—

Figure 1 is a top view, and Fig. 2 a side view, of a shoe-upper closed and provided with my invention, the nature of which is defined in the claims hereinafter presented. Fig. 3 is a side view of the upper as open or having its lacing-fly turned partly forward, so as to expose the lacing and lacing-strips, to be described. Fig. 4 is a horizontal section taken through the lacing-fly.

The instep-opening down the front of this shoe-upper D has a covering-fly, A, fixed to one edge of it, and extending across the opening and down along one side of the instep and ankle part.

In carrying out my invention I affix to the inner side of the said fly, close along its outer edge, a narrow strip, B, of leather or other suitable material, which is to be connected to the fly by stitching the strip along each longer edge of it directly to the fly, such strip having within it lengthwise of it a series of lacing-holes, *a*, or eyelets. Another such strip, C, provided with a like series of lacing-holes, *b*, or eyelets arranged in it lengthwise of it, is fastened to the part of the upper that, when the fly is closed, is lapped on or directly covered by the first-named strip. A lacing, D', fixed at its lower end to the eye of a button, *c*, is run through each successive two holes of each strip—that is to say, such lacing is first carried through the fly, thence through the lowest two holes of the inner strip, next through the next two holes of the outer strip, thence back through two holes of the inner strip, thence through two holes of the outer strip, and so on to the top of the ankle portion of the shoe. On drawing the lacing tightly the fly will be brought closely down and the instep-opening will be closed. Another or auxiliary lacing, E, having a button, *h*, fixed to it at its lower end, is run through the fly near its lower end, thence up between the fly and the outer strip, and out at the top of the shoe. This auxiliary lacing serves with the first one as a means of tying it in order to keep the fly properly closed. By pulling on either button the lacing affixed to it may be extracted from the upper.

From the above it will be seen that when the fly is drawn closely down by the lacing the latter, where between the fly and the part covered thereby, will be completely covered by the fly, so as to be invisible.

I claim—

1. In a shoe-upper, the combination of its instep-opening-covering fly having on its inner side a strip attached at or near its opposite edges to the said fly, and furnished with a series of lacing-holes extending only through it, (the said strip,) with another such strip provided with a like series of lacing-holes and attached at or near its two opposite longer edges to the part of the upper that is overlapped by the first-named strip when the fly is closed, all being substantially as described, and such two strips having a lacing applied to their holes, as set forth.

2. In a shoe-upper, the combination of its instep-opening-covering fly, having fixed in its inner side a strip of leather or other suitable material, provided with a series of lacing-holes arranged in it, and secured at or near each of its two longer edges to the fly, another such strip having a like set of lacing-holes and secured in like manner to the part of the upper that is overlapped by the first-named strip when the fly is closed, a lacing run through the holes of the two strips, and the auxiliary lacing or cord fixed or applied to the fly, and for use with the primary lacing, substantially as represented.

THOMAS JOSEPH LYNCH.

Witnesses:
N. B. JOHNSON,
W. A. HUSSEY.